(12) United States Patent
Xu et al.

(10) Patent No.: US 9,194,965 B2
(45) Date of Patent: Nov. 24, 2015

(54) SYSTEM AND METHOD FOR X-RAY IMAGE ACQUISITION AND PROCESSING

(71) Applicant: General Electric Company, Schenectady, NY (US)

(72) Inventors: Yi Xu, Niskayuna, NY (US); Frederick Wilson Wheeler, Niskayuna, NY (US); Bernhard Erich Hermann Claus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 295 days.

(21) Appl. No.: 13/668,002

(22) Filed: Nov. 2, 2012

(65) Prior Publication Data

US 2014/0126696 A1 May 8, 2014

(51) Int. Cl.
*G01N 23/083* (2006.01)
*G01T 1/29* (2006.01)

(52) U.S. Cl.
CPC ........................ *G01T 1/295* (2013.01)

(58) Field of Classification Search
CPC ................ H04N 5/23264; H04N 5/23277
USPC ...................................... 378/2, 62
See application file for complete search history.

(56) References Cited

U.S. PATENT DOCUMENTS

| | | | | |
|---|---|---|---|---|
| 5,293,574 A | * | 3/1994 | Roehm et al. | 378/98.2 |
| 5,930,314 A | * | 7/1999 | Lanza | 376/159 |
| 7,245,692 B2 | * | 7/2007 | Lu et al. | 378/4 |
| 7,580,620 B2 | * | 8/2009 | Raskar et al. | 396/55 |
| 7,962,031 B2 | * | 6/2011 | Tsai | 396/173 |
| 2005/0226361 A1 | * | 10/2005 | Zhou et al. | 378/4 |
| 2007/0258706 A1 | * | 11/2007 | Raskar et al. | 396/52 |
| 2009/0278928 A1 | * | 11/2009 | McCloskey | 348/143 |
| 2010/0027739 A1 | * | 2/2010 | Lanza et al. | 378/37 |
| 2010/0246989 A1 | | 9/2010 | Agrawal et al. | |
| 2010/0321509 A1 | * | 12/2010 | Torii | 348/208.4 |
| 2011/0182401 A1 | * | 7/2011 | Anashkin et al. | 378/8 |
| 2013/0272504 A1 | * | 10/2013 | Deutsch | 378/150 |

FOREIGN PATENT DOCUMENTS

WO       2011032082 A1     3/2011

* cited by examiner

*Primary Examiner* — Michael Maskell
(74) *Attorney, Agent, or Firm* — Robert M. McCarthy

(57) ABSTRACT

An imaging system is provided. The imaging system includes an X-ray radiation source. The imaging system also includes a source controller coupled to the X-ray radiation source and configured to modulate an exposure pattern from the X-ray radiation source to enable a coded exposure sequence. The imaging system further includes a digital X-ray detector configured to acquire image data that includes at least one coded motion blur.

22 Claims, 7 Drawing Sheets

SYSTEM AND METHOD FOR X-RAY IMAGE ACQUISITION AND PROCESSING

BACKGROUND

The subject matter disclosed herein relates to X-ray imaging systems and more particularly to image acquisition and processing using X-ray imaging systems.

A number of radiological imaging systems of various designs are known and are presently in use. Certain such systems are based upon generation of X-rays that are directed toward a subject of interest. The X-rays traverse the subject and impact a film or a digital detector. Increasingly, such X-ray systems use digital circuitry for detecting the X-rays, which are attenuated, scattered or absorbed by the intervening structures of the subject. In medical diagnostic contexts, for example, such systems may be used to visualize internal tissues and diagnose patient ailments. In other contexts, parts, baggage, parcels, and other subjects may be imaged to assess their contents and for other purposes.

Basic X-ray systems may be designed for generating projection images only. Such projection images may be presented as a standard X-ray image, although the image data itself is subject to various presentations. In addition to projection X-ray systems, other types of systems include fluoroscopy systems, computed tomography systems, and tomosynthesis systems that are based on similar X-ray radiation generation and detection. In computed tomography and tomosynthesis systems, for example, volumetric images are typically computed as a set of slices through the subject based upon various reconstruction techniques applied to multiple directly collected X-ray projection images.

During the acquisition of image data with one or more of the radiological imaging systems, image quality degradation due to motion blur may occur in the image data caused by various types of motion. One effect of motion blur on the image is that high-frequency features (e.g., edges in the image) may be smeared. Types of motion that may cause motion blur include patient/tissue motion (e.g., cardiac, respiratory, etc.), instrument motion, detector motion, gantry motion, and X-ray radiation source motion. Various techniques exist for dealing with motion blur. However, these techniques may result in prolonging image acquisition time, requiring additional mechanical capabilities for an imaging system, increasing image noise, and/or losing image information during image processing.

BRIEF DESCRIPTION

In accordance with a first embodiment, an imaging system is provided. The imaging system includes an X-ray radiation source. The imaging system also includes a source controller coupled to the X-ray radiation source and configured to modulate an exposure pattern from the X-ray radiation source to enable a coded exposure sequence. The imaging system further includes a digital X-ray detector configured to acquire image data that includes at least one coded motion blur.

In accordance with a second embodiment, an imaging method is provided. The imaging method includes commanding an X-ray radiation source to perform an X-ray exposure via a source controller. The imaging method also includes modulating an exposure pattern from the X-ray radiation source to generate a coded exposure sequence. The imaging method further includes acquiring image data that includes at least one coded motion blur from a digital X-ray detector.

In accordance with a third embodiment, an image processing method is provided. The image processing method includes acquiring image data that includes at least one coded blur derived from a coded exposure sequence from a digital X-ray detector. The image processing method also includes digitally restoring the image data by compensating for the at least one coded motion blur.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
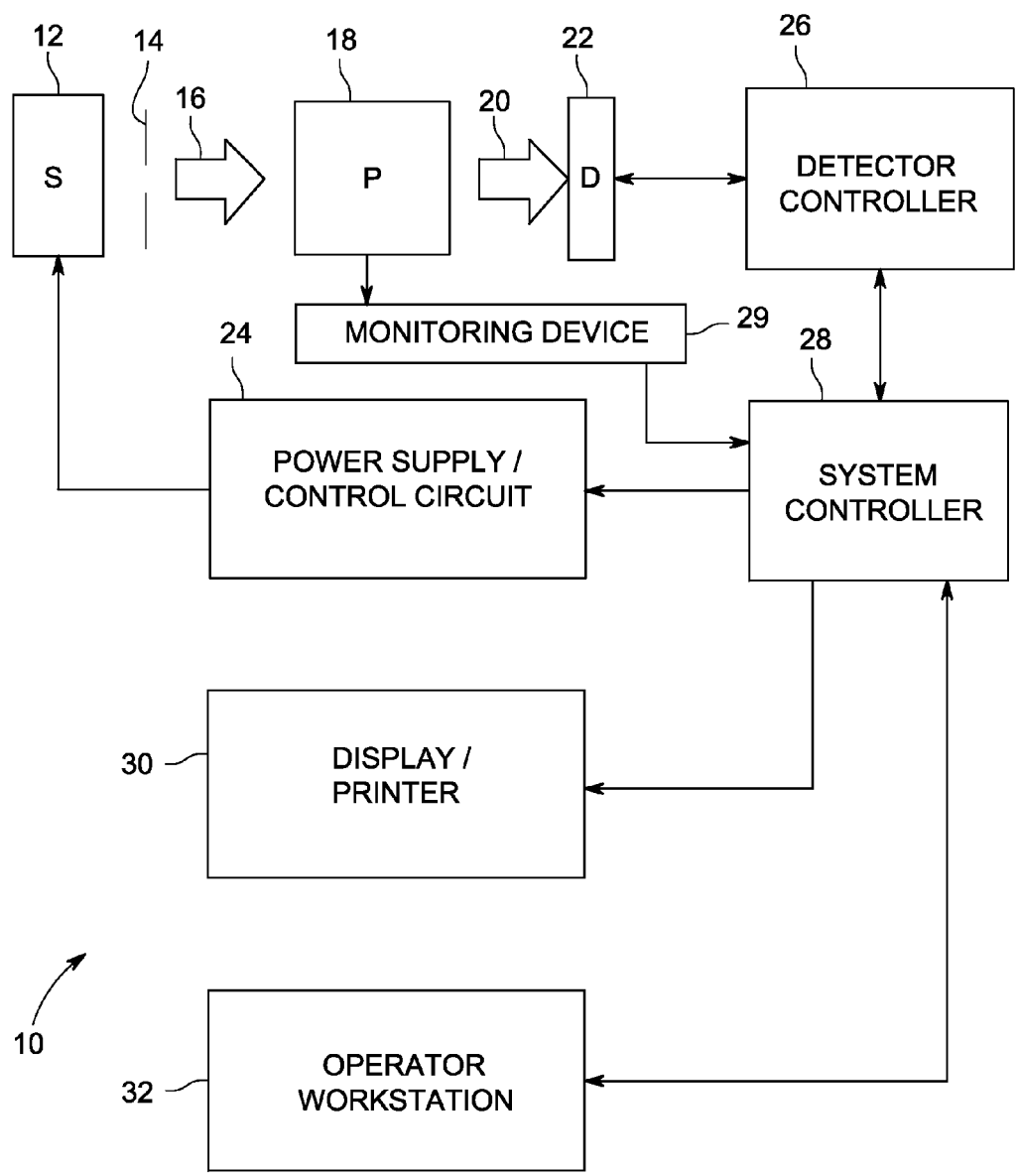
FIG. 1 is a diagrammatical overview of a digital X-ray imaging system in which the present technique may be utilized.

FIG. 1 illustrates diagrammatically an imaging system 10 for acquiring and processing discrete pixel image data. In particular, the imaging system 10 employs a coded exposure technique and digital restoration techniques to correct for motion blurs in image data (e.g., projection images). Coded exposure utilizes a correlation between image data (or images) obtained while modulating an exposure pattern (e.g., coded exposure sequence) from an X-ray radiation source. In the illustrated embodiment, system 10 is a digital X-ray system designed both to acquire original image data, and to process the image data for display in accordance with the present technique. In traditional systems of the prior art, each individual x-ray projection image (or image within a sequence of images) is acquired using a single fixed length exposure with (nominally) constant mA, and the corresponding data is collected using a single detector read-out. In the case of motion blur, this will lead to an irretrievable loss of image information, as discussed in more detail herein below. In contrast, with the present technique, at least some image data may be collected using a coded exposure, i.e., a modulated exposure (achieved, e.g., through switching the x-ray source on and off according to some code, or through modulating the x-ray intensity, or other means). The data corresponding to a code may be collected in a single detector read-out, or the code may be spread across two or more detector read-outs. With this approach, one may then compensate for image blurring associated with motion using suitable processing steps, as described in more detail herein below.] Throughout the following discussion, however, while basic and background information is provided on the digital X-ray system used in medical diagnostic applications, it should be born in mind that aspects of the present techniques may be applied in different settings (e.g., conventional medical imaging, projection X-ray imaging, fluoroscopy imaging, C-arm angiography imaging, computed tomography imaging, tomosynthesis imaging, etc.) as well as for non-medical purposes (e.g., parcel, baggage, vehicle and part inspection, reconnaissance, etc.).

In the embodiment illustrated in FIG. 1, imaging system 10 includes a source of X-ray radiation 12 positioned adjacent to a collimator 14. Collimator 14 permits a stream of radiation 16 to pass into a region in which a subject, such as a human patient 18 is positioned. In certain embodiments, the collimator 14 may include a physical shutter (e.g., rotating collimator blade) disposed in front of the source 12. The physical shutter may include a series of different sized openings corresponding to a coded exposure sequence for modulating an exposure pattern by blocking the source 12 for durations of the coded exposure sequence. A portion of the radiation 20 passes through or around the subject and impacts a digital X-ray detector, represented generally at reference numeral 22. As described more fully below, detector 22 converts the X-ray photons received on its surface to lower energy photons, and subsequently to electric signals which are acquired and processed to reconstruct an image of the features within the subject. In certain embodiments, image data acquired from the detector 22 may be subject to coded blur. An object point that is subject to motion blur may appear in the image as a "blurred point", having a footprint spanning multiple pixels on a detected image. The characteristics of the blurring (including the footprint) can be represented as point spread functions (PSFs). The coded blurs, according to one aspect of the present invention, correspond to specific motion blurs (e.g., invertible motion blurs) within the image data obtained during the coded exposure sequence that are correlated with the modulated exposure pattern, which can be reversed through processing. In some embodiments, the image blur may include other factors, e.g., focal spot blurring (i.e., blurring due to the size of the focal spot of the X-ray source), blurring due to detector/readout properties, etc.

Figure 4:
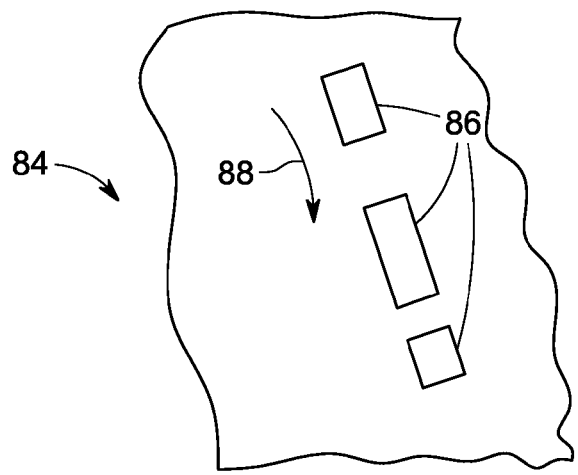
FIG. 4 is a top view of a portion of a physical shutter (e.g., rotating collimator blade) in accordance with one embodiment.

Source 12 is controlled by a power supply/control circuit 24 (e.g., source controller) which furnishes both power and control signals for the acquisition of individual images, or image sequences. In certain embodiments, the source controller 24 may modulate an exposure pattern from the source 12 to generate a coded exposure sequence. The coded exposure sequence may include a sequence of X-ray radiation pulses that may vary by pulse duration or durations of time between each X-ray radiation pulse. This may be achieved by turning the source 12 on and off quickly according to an explicitly designed pseudo random pattern (e.g., binary pattern). Alternatively, the source controller 24 may modulate the exposure pattern to generate the coded exposure sequence by continuously varying an intensity of X-ray radiation (e.g., via changing the milliamperes (mA)) emitted from the source 12. In certain embodiments, the exposure pattern may be modulated via the physical shutter described above and in FIG. 4. Other, hybrid approaches to generating a coded exposure may also be used, including a combination of source mA modulation and pulse width control, or a combination of source mA modulation with a physical shutter or collimator. In some embodiments, the exposure pattern may be achieved by balancing the complexity of the tube control and the collimator/shutter design. For example, a rotating shutter with uniform openings may be combined with an appropriately switched X-ray source. Other tradeoffs between X-ray source pulse sequence, mA modulation, and shutter design may be used as well.

Moreover, detector 22 is coupled to a detector controller 26 which commands acquisition of the signals generated in the detector (e.g., detector readouts). Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. For example, the system controller 28 may command the imaging system 10 to switch between a normal image acquisition mode (e.g., exposure where radiation is emitted at a constant intensity over a set exposure time) or a coded exposure image acquisition mode in response to input related to movement of an imaged object (e.g., organ, body, tissue, etc.). For example, the system controller 28 may be coupled to a monitoring device 29 coupled to the patient 18 that monitors motion of specific tissues or organs (e.g., using electrocardiography). Based on a signal (e.g., EKG signal), the system controller 28 may switch to coded exposure image acquisition mode for high-motion parts of an imaging sequence and switch back to normal acquisition mode during the low-motion parts.

In the present context, system controller 28 also includes signal processing circuitry, typically based upon a general purpose or application-specific digital computer; and associated manufactures, such as optical memory devices, magnetic memory devices, or solid-state memory devices (e.g., non-transitory computer readable media), for storing programs and routines executed by a processor of the computer to carry out various functionalities, as well as for storing configuration parameters and image data; interface circuits; and so forth. For example, these programs and routines may enable processing of image data that includes one or more coded blurs to digitally restore the image data by compensating for the coded blurs to generate one or more deblurred images. The programs and routines may utilize algorithms such as Wiener filtering and iterative deconvolution methods (e.g., Richard-Lucy method) to compensate for the coded blurs, when given a blur kernel as a parameter. The programs and routines may enable a determination of a specific width of a motion blur based on a speed of an imaged object (e.g., organs) and/or imaging system components (e.g., tube, detector, gantry, etc.) mapped back to an image plane using appropriate system parameters (including system magnification, focal spot size, pixel size, etc.). The speed of the imaged object and/or imaging system components may be estimated based on known, measured, or estimated speeds. For example, a determination of speed for an organ may be electrocardiogram based. Alternatively, the speed may be a user input into a deblurring algorithm. In some embodiments, speed may be estimated based on one or more image quality parameters that quantify blurring (e.g., of certain structures) in the image. Alternatively, speed may also be determined, e.g., by estimating the displacement of structures between consecutive image frames in an image sequence.

In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. Operator workstations 32 may also be used for interactive selection of parameters for one or more of exposure, image acquisition, selection of appropriate codes, image deblurring, etc. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
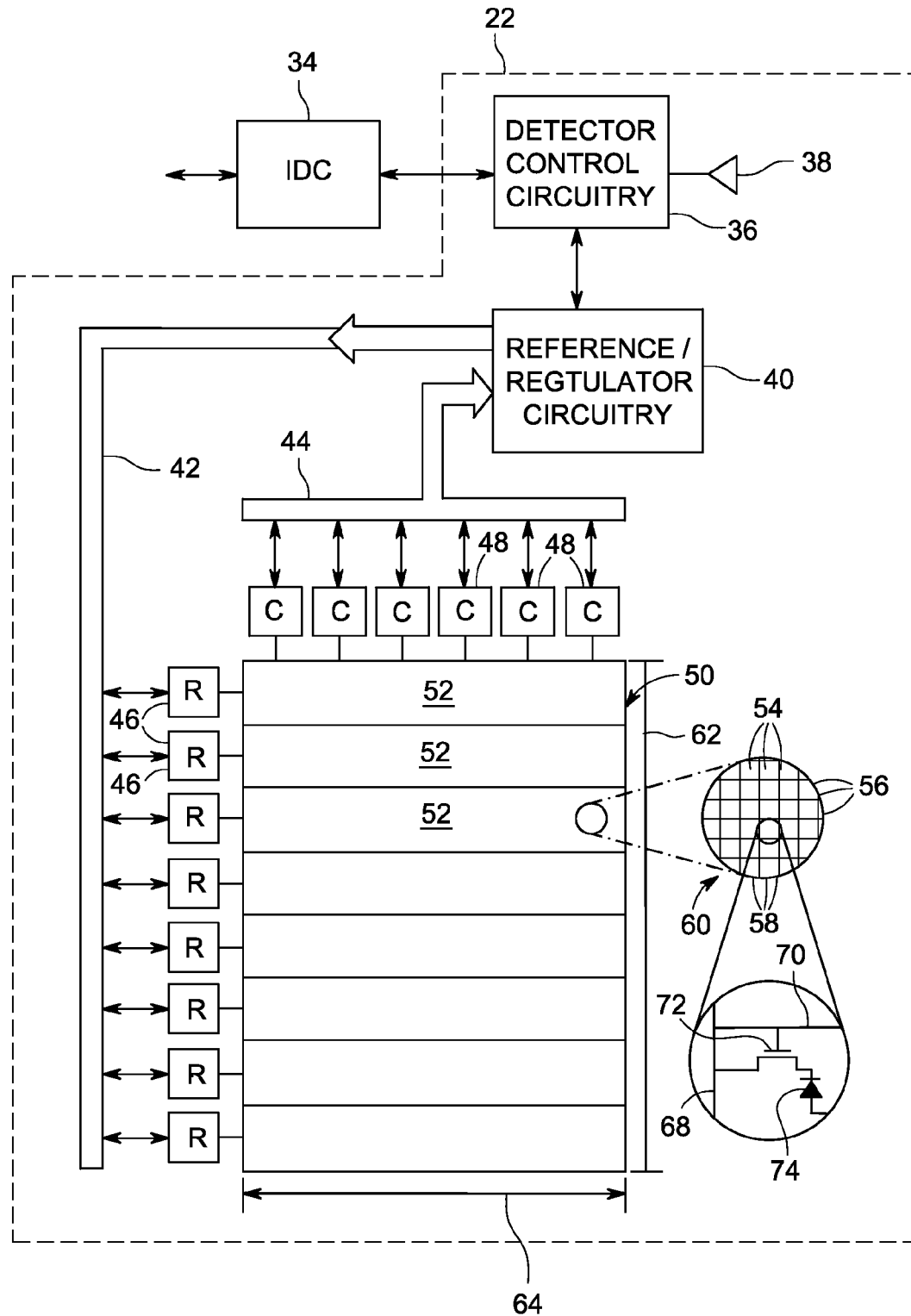
FIG. 2 is a diagrammatical representation of the functional circuitry in a detector of the system of FIG. 1 to produce image data for reconstruction, in accordance with one embodiment.

FIG. 2 is a diagrammatical representation of functional components of digital detector 22 according to one embodiment. FIG. 2 also represents an imaging detector controller or IDC 34 which will typically be configured within detector controller 26. IDC 34 includes a CPU or digital signal processor, as well as memory circuits for commanding acquisition of sensed signals from the detector. IDC 34 is coupled via two-way conductors to detector control circuitry 36 within detector 22. IDC 34 thereby exchanges command signals for image data within the detector during operation.

Detector control circuitry 36 receives DC power from a power source, represented generally at reference numeral 38. Detector control circuitry 36 is configured to originate timing and control commands for row and column drivers used to transmit signals during data acquisition phases of operation of the system. Circuitry 36 therefore transmits power and control signals to reference/regulator circuitry 40, and receives digital image pixel data from circuitry 40. In one embodiment, the detector may be read out in a binned mode, thereby enabling a faster readout, in combination with a reduced image resolution. This mode may be used by itself or in combination with the full-resolution mode, e.g., by alternating, or suitably interleaved image acquisition sequences. The varying detector resolution may be taken into account appropriately in the deblurring algorithm.

In certain embodiments, detector 22 consists of a scintillator that converts X-ray photons received on the detector surface during examinations to lower energy (light) photons. An array of photodetectors then converts the light photons to electrical signals which are representative of the number of photons or the intensity of radiation impacting individual pixel regions of the detector surface. In other embodiments, the X-ray photons may be directly converted to electrical signals. Readout electronics convert the resulting analog signals to digital values that can be processed, stored, and displayed, such as in a display 30 or a workstation 32 following reconstruction of the image. In a present form, the array of photodetectors is formed on a single base of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics. The drains of the transistors in a column are connected together and an electrode of each column is connected to readout electronics.

In the particular embodiment illustrated in FIG. 2, by way of example, a row bus 42 includes a plurality of conductors for enabling readout from various columns of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector.

In the illustrated embodiment, row drivers 46 and readout electronics 48 are coupled to a detector panel 50 which may be subdivided into a plurality of sections 52. Each section 52 is coupled to one of the row drivers 46, and includes a number of rows. Similarly, each column driver 48 is coupled to a series of columns. The photodiode and thin film transistor arrangement mentioned above thereby define a series of pixels or discrete picture elements 54 which are arranged in rows 56 and columns 58. The rows and columns define an image matrix 60, having a height 62 and a width 64.

As also illustrated in FIG. 2, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode may be accessed via readout electronics 48, and converted to digital signals for subsequent processing and image reconstruction. In certain embodiments, the image data that includes coded motion blurs may be acquired or read out from the detector 22 after the entire coded exposure sequence. Alternatively, the coded exposure sequence may be spread across two or more detector readouts. In one embodiment, coded exposure sequences are not separate, but overlapping, e.g., a coded exposure sequence may share one or more X-ray pulses with the previous sequence.

Figure 3:
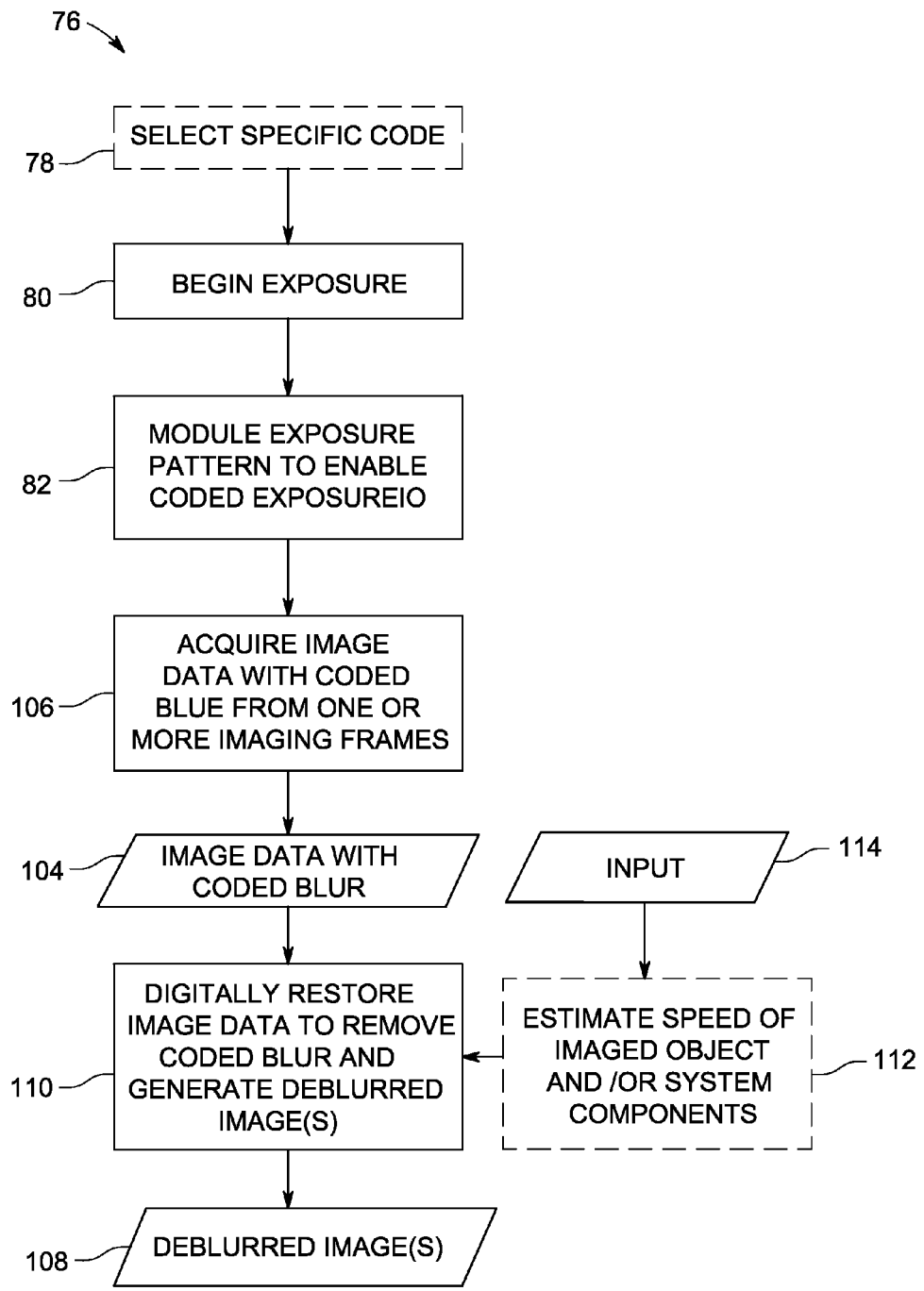
FIG. 3 is a flowchart of a process for operating a digital X-ray imaging system in accordance with one embodiment.

FIG. 3 illustrates a method 76 for operating the digital X-ray imaging system 10 (e.g., acquiring image data via a coded exposure sequence and processing the acquired image data to compensate for motion blurs). The following acts of the method 76 may be performed by various control circuitry and processing circuitry of the system 10 (e.g., source controller 24, system controller 28, etc.). In certain embodiments, the method 76 includes selecting a specific code (block 78) for modulating an exposure pattern from the source 12 during the coded exposure sequence. The code or exposure pattern may be designed so that the effective blurring convolutional kernel does not include any nulls (i.e., loss of image information) at spatial frequencies of interest. In certain embodiments, the design of the code or exposure pattern may be matched to specific clinical applications that include expected image features. In certain clinical applications, some frequencies may be more important than others. Thus, the code or pattern may be designed to maximize the contrast to noise ratio (CNR) (i.e., image quality) for the frequencies of interest. In some embodiments, the code or exposure sequence may be modified as a function of time, so that those frequencies having the strongest CNR impact in the deblurring process are not constant, but vary over time.

The method 76 includes beginning the exposure (block 80). Upon beginning the exposure, the method 76 includes modulating the exposure pattern from the source 12 (block 82) to enable a coded exposure sequence. In certain embodiments, a physical shutter 84 (e.g., rotating collimator blade) such as that illustrated in FIG. 4 may be disposed in front of the source 12. As illustrated, the physical shutter 84 may include a series of different sized openings 86 corresponding to a coded exposure sequence for modulating an exposure pattern by blocking the source 12 for durations of the coded exposure sequence as the shutter 84 rotates in direction 88. Alternatively, the physical shutter 84 may include a plurality of rotating collimator blades, where each blade is designed to produce a different coded exposure sequence based on the pattern of openings in the blade.

Figure 5:
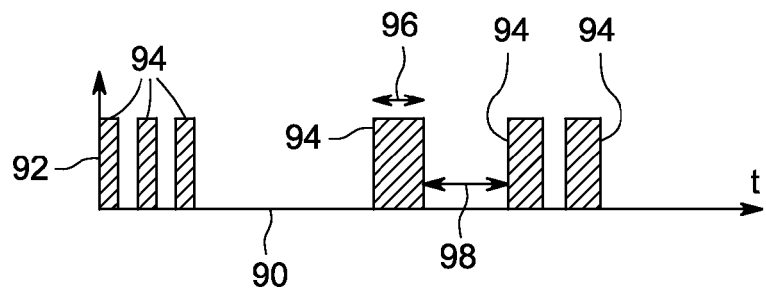
FIG. 5 is a representation of an exposure sequence (e.g., coded exposure sequence with varying pulse widths and offsets between pulses) in accordance with one embodiment.
Figure 6:
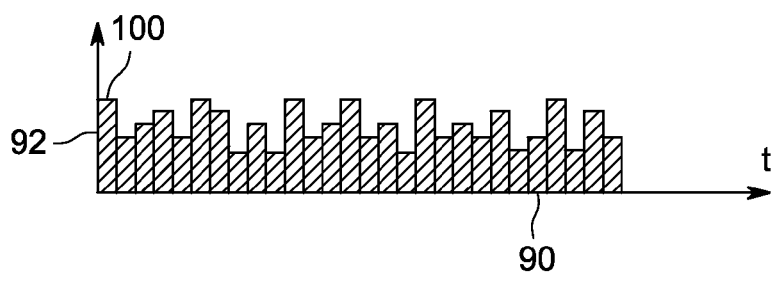
FIG. 6 is a representation of an exposure sequence (e.g., coded exposure sequence with continuously varied intensity) in accordance with one embodiment.
Figure 7:
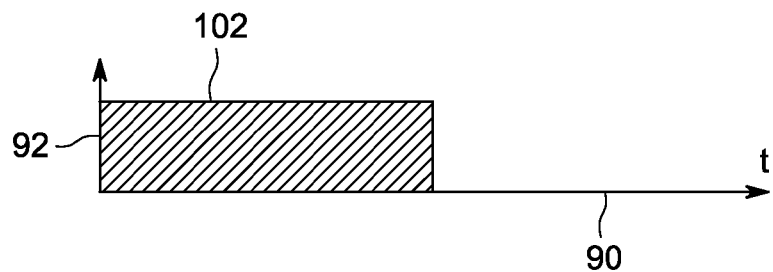
FIG. 7 is a representation of a normal exposure sequence in accordance with one embodiment.

In other embodiments, the exposure pattern may be modulated via electronic control of the source 12 (e.g., via the source controller 24 and/or system controller 28). The modulation of the exposure patterns is illustrated in FIGS. 5 and 6. FIGS. 5-7 are representations of exposure sequences, where x-axis 90 represents time of the exposure and y-axis 92 represents intensity (mA) of the exposure. FIGS. 5 and 6 illustrate coded exposures, while FIG. 7 represents a normal exposure. In some embodiments, the source 12 may be repeatedly turned on and off quickly according to an explicitly designed pseudo random pattern (e.g., binary pattern). As illustrated in FIG. 5, the coded exposure sequence as a result of turning the source 12 on and off may include a sequence of X-ray radiation pulses 94 (represented by boxes) that may vary by pulse duration 96 (e.g., pulse length time) or durations of time 98 (e.g., offsets) between each X-ray radiation pulse 94. In certain embodiments, the intensity of the X-radiation emitted from the source 12 may be continuously varied. This continuous variation in intensity may also occur according to an explicitly designed pseudo random pattern. As illustrated in FIG. 6, the emitted radiation 100 (represented by boxes) may continuously vary in intensity but the exposure sequence lacks any offsets. In certain embodiments, the exposure pattern may include a sequence of X-ray radiation pulses that varies in both intensities between the pulses but also includes offsets between the pulses. As mentioned above, the coded exposure sequences illustrated in FIGS. 5 and 6 may also be achieved via the use of the physical shutter 84 disposed in front of the source 12. In either coded exposure sequence, the modulated exposure pattern is designed to prevent losing image information and data at certain frequencies (e.g., frequencies of interest) during the coded exposure sequence. By contrast, in a normal exposure sequence, such as used in the normal image acquisition mode and illustrated in FIG. 7, the emitted radiation 102 (represented by a single box) is emitted at constant intensity during the exposure without offsets, and image information at certain frequencies is irretrievably lost.

Turning back to FIG. 3, the method 76 includes acquiring image data 104 with one or more coded blurs (e.g., invertible motion blurs) from one or more imaging frames (i.e., detector readouts) (block 106). For example, the image data 104 that includes one or more coded blurs may be acquired or read out from the detector 22 after the entire coded exposure sequence. Alternatively, the coded exposure sequence may be spread across two or more detector readouts. In certain embodiments, with two or more detector readouts, at least some of the readouts may represent image data collected at different exposure levels. The acquired image data 104 having the one or more coded blurs may be provided to the processing circuitry of the imaging system 10 (e.g., system controller 28) for further processing. The method 76 includes digitally restoring the image data 104 to compensate for the one or more coded blurs and generating one or more deblurred images 108 from the digitally restored image data (block 110). In the digital restoration, the processing circuitry may utilize a variety of algorithms to reverse or invert the coded blurs. For example, non-iterative algorithms or methods may be utilized such as Wiener deconvolution or any other non-iterative deconvolution algorithm. In other embodiments, iterative deconvolution methods may be utilized such as Richard-Lucy deconvolution or any other iterative deconvolution algorithm. Any of the non-iterative or iterative deconvolution algorithms may utilize the blur kernel as a parameter. The blur kernel may be a function of a combination of coded exposure sequence (e.g., coded X-ray pulse sequence of the X-ray source) with the blurring characteristics; including one or more of speed of the imaged object, speed of X-ray source and/or detector, detector blurring, detector resolution, focal spot size, etc. and parameters derived therefrom. In embodiments that encompass a further processing of the projection images, the deblurring step (or deconvolution) may be appropriately integrated into these processing steps. For example, in tomosynthesis acquisitions where (at least part of) the motion blurring may be induced by the motion of the X-ray source, each projection view may be deblurred individually, or the deblurring may be suitably integrated into the reconstruction step, where a 3D volume is formed from the set of acquired projection images.

In certain embodiments, the method 76 includes estimating a speed of an imaged object (e.g., organs) and/or imaging system components (e.g., tube, detector, gantry, etc.) mapped back to an image plane using appropriate system parameters (block 112). The estimated speed may be used in determining a specific width of each motion blur. The speed of the imaged object and/or imaging system components may be estimated based on various inputs 114 such as known, measured, or estimated speeds of the imaged object and/or imaging system components. For example, a determination of speed for an organ may be electrocardiogram based (e.g., via input 114 received from the monitoring device 29. Alternatively, the speed may come from a user input 114 into a deblurring algorithm. In some embodiments, speed may be estimated based on one or more image quality parameters that quantify blurring (e.g., of certain structures) in the image. In certain embodiments, the estimation of speed may be made prior to image acquisition. In some embodiments, the speed of the object may also serve as an input to the selection of the coded exposure sequence. For example, when the "length" of the code is scaled in an inverse relationship to the speed of the object, the (coded) image blurring footprint of the imaged object remains constant, thereby preserving image quality characteristics independent of object speed.

Figure 8:
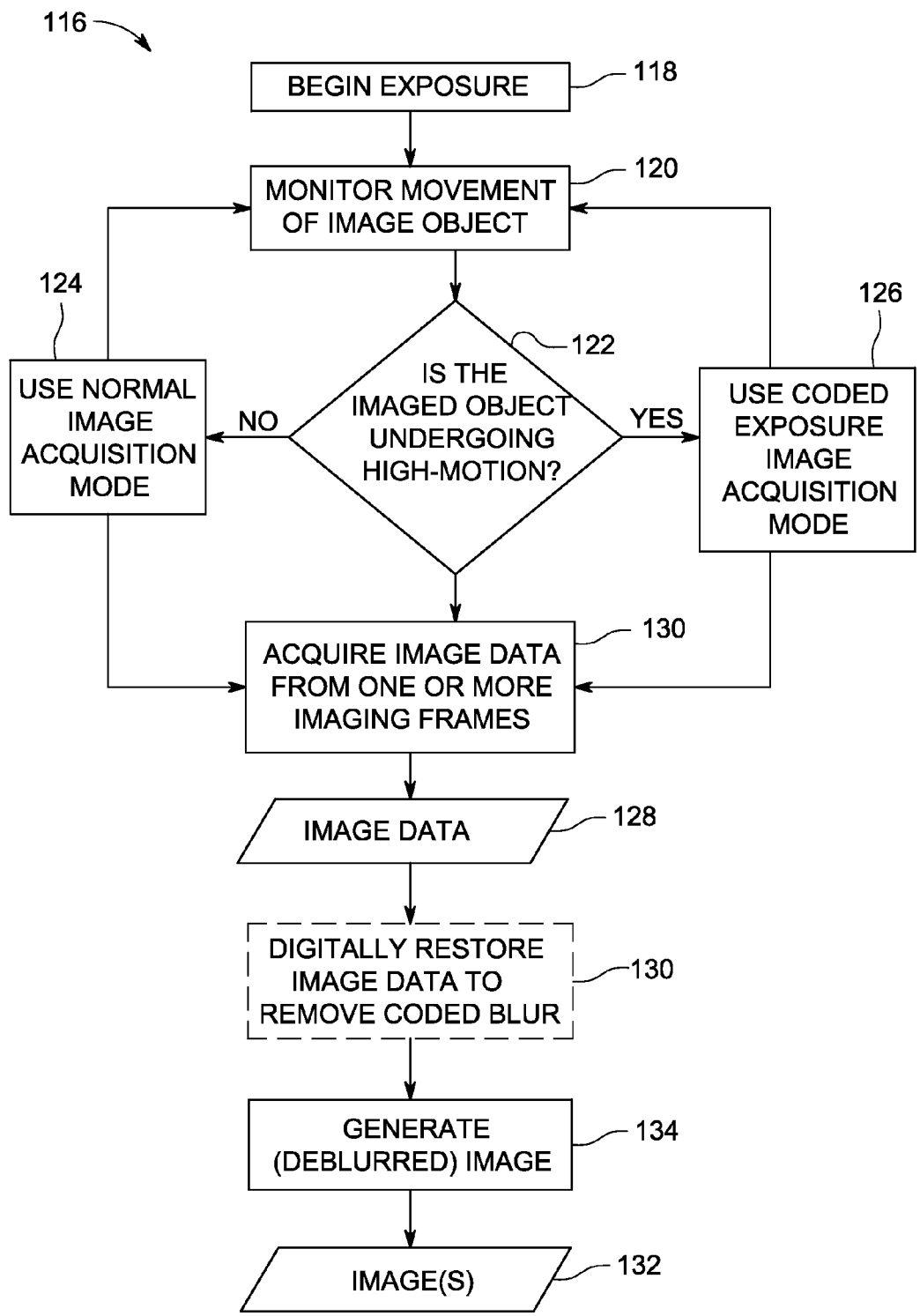
FIG. 8 is flowchart of a process for operating a digital X-ray imaging system that includes switching between normal and coded exposure image acquisition modes in accordance with one embodiment.

As mentioned above, in certain embodiments, the system controller 28 may command the imaging system 10 to switch between a normal image acquisition mode (e.g., exposure where radiation is emitted at a constant intensity over set exposure time) or a coded exposure image acquisition mode in response to input related to movement of an imaged object (e.g., organ, body, tissue, etc.). For example, the system 10 may utilize this switching between modes in certain angiographic imaging scenarios. FIG. 8 illustrates a method 116 for operating the digital X-ray imaging system 10 (e.g., switching between normal and coded exposure image acquisition modes). The following acts of the method 116 may be performed by various control circuitry and processing circuitry of the system 10 (e.g., source controller 24, system controller 28, etc.). The method 116 includes beginning the exposure (block 118). Prior to or subsequent to beginning the exposure, the method 116 includes monitoring movement of an imaged object (e.g., specific tissues or organs) (block 120). For example, as described above, the system controller 28 may be coupled to the monitoring device 29 coupled to the patient 18 that monitors for motion of specific tissues or organs (e.g., using electrocardiography).

The method 116 also includes determining whether the imaged object is undergoing high motion (e.g., motion at a speed that results in significant motion blurs in image data that degrades image quality) (block 122). In response at least in part to a signal (e.g., EKG signal) received from the monitoring device 29, the method 116 includes utilizing the normal image acquisition mode (block 124) to acquire image data if the imaged object is not undergoing high-motion. If the imaged object is undergoing high-motion, the method 116 includes utilizing the coded exposure image acquisition mode (block 126) described in method 76 of FIG. 3. The method 116 includes continuing to monitor movement of the imaged object (block 120) while in the normal image acquisition mode or the coded exposure image acquisition mode. Thus, based on the signal (e.g., EKG signal), the system controller 28 may switch to coded exposure image acquisition mode for high-motion parts of an imaging sequence and switch back to the normal acquisition mode during the low-motion parts (where the motion is least likely to result in blurs in the image data) or vice versa.

In addition, the method 116 includes acquiring image data 128 from one or more imaging frames (i.e., detector readouts) (block 130). In certain embodiments, the image data 128 may include one or more coded blurs (e.g., invertible motion blurs) if the coded exposure image acquisition mode was utilized. As described above, the image data 128 may be acquired from one or more detector readouts. The acquired image data 128 may be provided to the processing circuitry of the imaging system 10 (e.g., system controller 28) for further processing. In particular, if the acquired image data 128 has one or more coded blurs, the method 116 includes digitally restoring the image data 128 to compensate for the one or more coded blurs (block 130) as described above in method 76 of FIG. 3. The method 116 further includes generating one or more images 132 (e.g., deblurred images if the image data needed to be digitally restored due to coded blurs) from the image data 128 (block 134).

Figure 9:
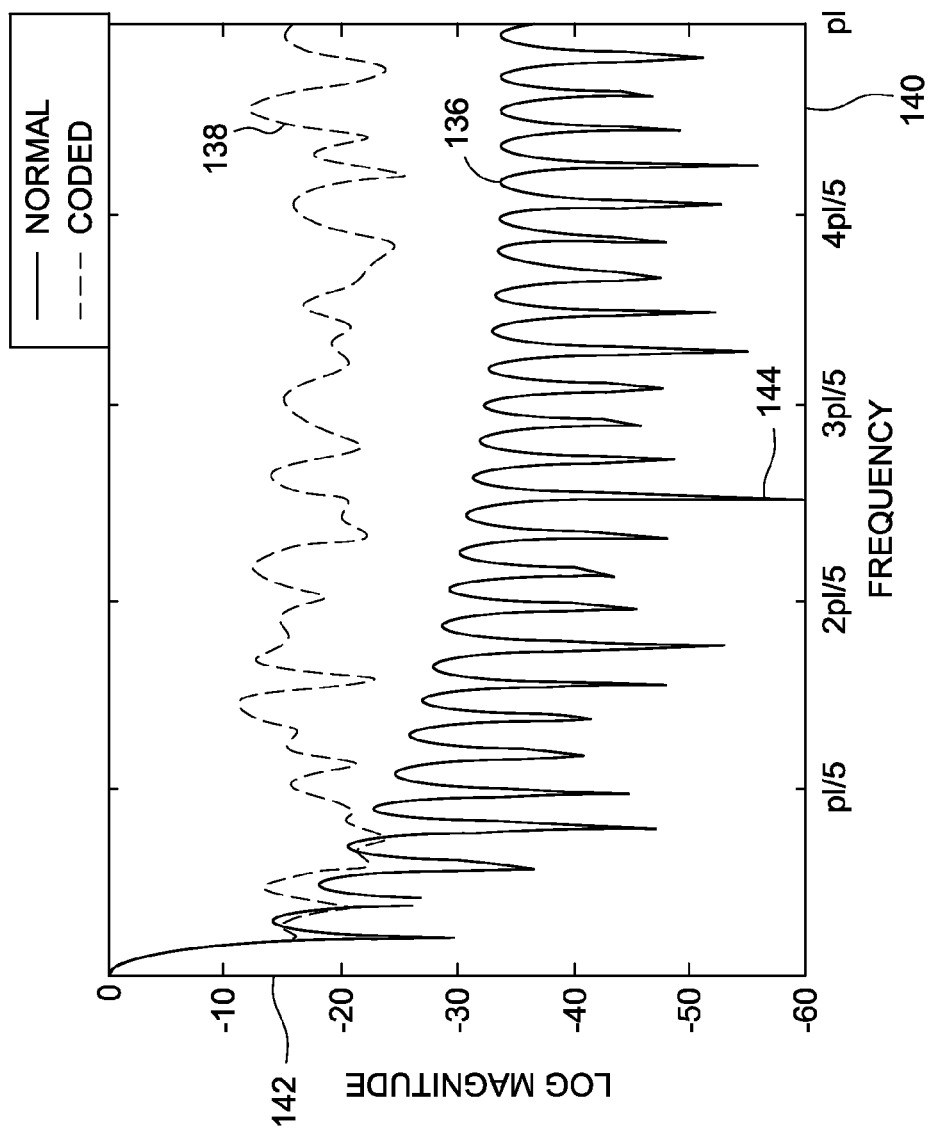
FIG. 9 is a graphical representation of frequency transformed point spread functions (PSFs) for input signals acquired via a normal exposure and a coded exposure, respectively, in accordance with one embodiment.

As mentioned above, the code or exposure pattern may be designed so that the effective blurring convolutional kernel (i.e., PSF) does not include any nulls (i.e., complete, or nearly complete, loss of image information) at spatial frequencies of interest. FIG. 9 is a graphical representation of frequency transformed PSF of the input signals acquired via a normal exposure (solid line 136) and a coded exposure (dotted line 138). In FIG. 9, x-axis 140 represents the frequency of the signals and y-axis 142 represents the logarithmic magnitude of the frequency transformation. As depicted, the transformed PSF 136 acquired during the normal exposure includes certain frequencies (e.g., the frequency at region 144) where image information is lost (i.e., nulls). These nulls may lead to increased noise during further processing of the image data. In contrast, the transformed PSF 138 acquired during the coded exposure does not exhibit frequencies where the image information is lost. Thus, modulating the exposure pattern via the coded exposure prevents losing image information at certain frequencies.

Figure 10:
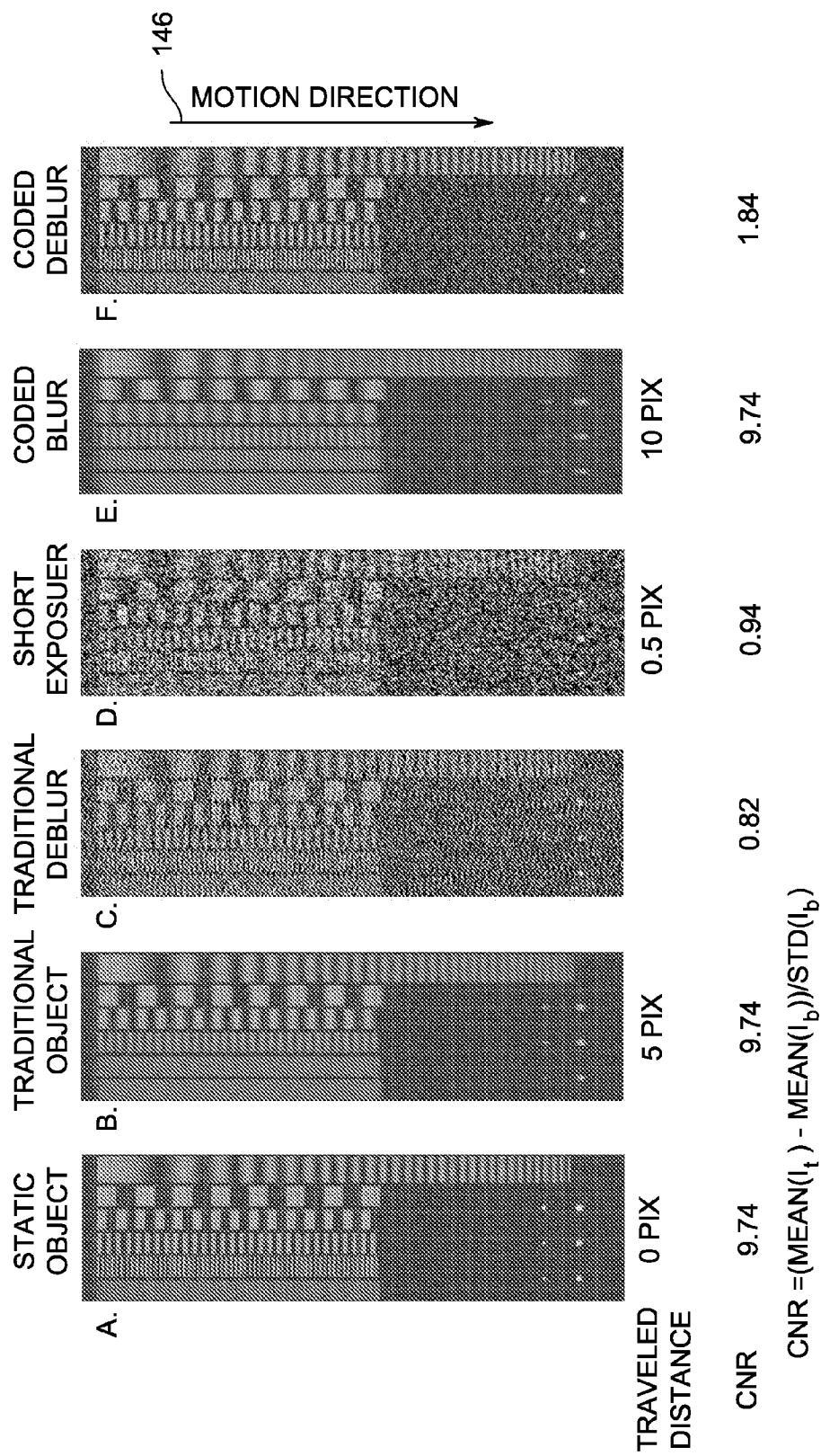
FIGS. 10A-F are representations of test patterns of different spatial frequencies and of small round structures taken under different image acquisition and processing techniques.

FIGS. 10A-F further illustrate the effect of utilizing the coded exposure and digital restoration techniques described above. FIGS. 10A-F include patterns of different frequencies at six different small structures ranging from two to six pixels in diameter. FIG. 10A represents an image of a static object. FIG. 10B represents an image taken via a normal exposure that includes a blur. FIG. 10C represents the image in FIG. 10B after utilizing standard deblurring techniques (e.g., deconvolution). FIG. 10D represents an image acquired using a very short exposure (e.g., objects move very little and appear to be static during the short exposure) and by scaling up the intensity. FIG. 10E represents an image that includes coded blurs utilizing the coded exposure technique described above. FIG. 10F represents the image in FIG. 10E after utilizing the digital restoration technique described above. The motion of the imaged object was at approximately 0.5 pixels per millisecond in direction 146. At the bottom of FIGS. 10A-F, the distance traveled in direction 146 is provided. For example, FIG. 10A traveled zero pixels, FIGS. 10B and C traveled five pixels, FIG. 10D traveled 0.5 pixels, and FIGS. 10E and F traveled 10 pixels. In addition, at the bottom of FIGS. 10A-F, the CNR (e.g., representative of image quality) is provided. The CNR was calculated by the following equation:

$$\text{CNR} = (\text{mean}(I_t) - \text{mean}(I_b))/\text{std}(I_b), \quad (1)$$

where $I_t$ represents the total intensity of the image and $I_b$ represents the background intensity of the image. As illustrated, the coded deblur followed by digital restoration, as illustrated in FIG. 10F, results in the removal of the blurs, but also results in a higher CNR (i.e., image quality) then either traditional deblurring in the absence of coded exposure (i.e., FIG. 10C) or utilizing a very short exposure time (i.e., FIG. 10D).

Technical effects of the disclosed embodiments include providing methods and systems to correct for motion blurs in image data (e.g., projection images). In particular, the disclosed embodiments provide coded exposure techniques and digital restoration techniques to correct for motion blurs. The advantages of these techniques include enabling the imaging of moving objects that otherwise would be blurred (e.g., during fluoroscopy). Additional advantages of the techniques include reducing the imaging acquisition time by avoiding the need of stopping a moving object to acquire image data. For example, in industrial or luggage inspection applications, the parts or luggage undergoing inspection may go through the X-rays continuously without stopping, while maintaining image quality. Also, in tomosynthesis imaging applications, continuous X-ray source motion and/or image pasting with a continuously (or faster) moving detector may be utilized.

This written description uses examples to disclose the present subject matter, including the best mode, and also to enable any person skilled in the art to practice the present approaches, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. An imaging system comprising:
an X-ray radiation source;
a source controller coupled to the X-ray radiation source and configured to modulate an exposure pattern from the X-ray radiation source to enable a coded exposure sequence wherein the source controller is configured to modulate the exposure pattern by repeatedly turning the X-ray radiation source on and off to generate a sequence of X-ray radiation pulses having varying pulse durations or varying durations between the X-ray radiation pulses; and
a digital X-ray detector configured to acquire image data that includes at least one coded motion blur, wherein the image data is acquired from one or more imaging frames and wherein at least one imaging frame contains at least two X-ray radiation pulses.

2. The imaging system of claim 1, wherein the source controller is configured to repeatedly turn the X-ray radiation source on and off according to a binary pattern.

3. The imaging system of claim 1, wherein the source controller is configured to modulate the exposure pattern by continuously varying an intensity of X-ray radiation emitted from the X-ray radiation source.

4. The imaging system of claim 1, wherein the source controller is configured to modulate the exposure pattern by repeatedly turning the X-ray radiation source on and off to generate a sequence of X-ray radiation pulses having varying pulse durations or varying durations between the X-ray radiation pulses, and wherein the source controller is configured to modulate the exposure pattern by continuosly varying an intensity of X-ray radiation emitted from the X-ray radiation during one or more pulse durations.

5. The imaging system of claim 1, comprising a physical shutter disposed in front of the X-ray radiation source, wherein the physical shutter comprises a series of different sized openings corresponding to the coded exposure sequence, and the physical shutter is configured to block the X-ray radiation source for durations of the coded exposure sequence.

6. The imaging system of claim 1, comprising circuitry configured to receive the image data that includes the at least one coded motion blur, to digitially restore the image data by removing the at least one coded motion blur, and to generate at least one deblurred image from the digitally restored image data.

7. The imaging system of claim 6, wherein the circuitry is configured to estimate a speed of an imaged object or imaging system components to determine a width of the at least one coded motion blur.

8. The imaging system of claim 6, wherein the removing the at least one coded motion blur is a function of blur characteristics in the blur image, and wherein the blur characteristics are a function of the coded exposure sequence and one or more of speed of the imaged object or structures, speed of the X-ray radiaton source, speed of the digital X-ray detector, focal spot size, detector resolution, and system magnification.

9. The imaging system of claim 1, wherein the source controller is configured to modulate the exposure pattern to prevent losing the image information at certain frequencies during the coded exposure sequence.

10. The imaging system of claim 1, wherein the source controller is configured to switch between a normal image acquisition mode and a coded exposure image acquistion mode based on input related to movement of an imaged object.

11. An imaging method comprising:
commanding an X-ray radiation source to perform an X-ray expoure via a source controller;
modulating an exposure pattern from the X-ray radiation source to generate a coded exposure sequence, wherein modulating the exposure pattern comprises repeatedly turning the X-ray radiation source on and off to generate a sequence of X-ray radiation pulses having varying pulse duration or varying durations between the X-ray radiaton pulses; and
acquiring image data that includes at least one coded motion blur from a digital X-ray detector, wherein the image data is acquired from one or more imaging frames and wherein at least one imaging frame contains at least two X-ray radiation pulses.

12. The imaging method of claim 11, wherein modulating the exposure pattern comprises repeatedly turning the X-ray radiation source on and off according to a binary pattern.

13. The imaging method of claim 11, wherein modulating the exposure pattern comprises continuously varying an intensity of X-ray radiaton emitted from the X-ray radiation source.

14. The imaging method of claim 11, wherein modulating the exposure pattern comprises continuously repeatedly turning the X-ray radiation source on and off to generate a sequence of X-ray radiation pulses having varying pulse duration or varying durations between the X-ray radiation pulses, and wherein modulating the exposure pattern comprises continuosly varying an intensity of X-ray radiation emitted from the X-ray radiation source during one or more pulse durations.

15. The imaging method of claim 11, wherein modulating the exposure pattern comprises blocking the X-ray radiation source for durations of the coded exposure sequence via a physical shutter disposed in front of the X-ray radiation source, and the physical shutter comprises a series of different sized openings corresponding to the coded exposure sequence.

16. The imaging method of claim 11, comprising digitally restoring the image data by removing the at least one coded motion blur.

17. The imaging method of claim 16, comprising generating at least one deblurred image from the digitally restored image data.

18. The imaging method of claim 11, comprising estimating a speed of an imaged object or imaging system components to determine a width of the at least one coded motion blur.

19. The imaging method of claim 11, wherein modulating the exposure pattern comprises preventing loss of the image information at certain frequencies during the coded exposure sequence.

20. An image processing method comprising:
modulating an exposure pattern from an X-ray radiation source to generate a coded exposure sequence, wherein modulating the exposure pattern comprises repeatedly turning the X-ray radiation source on and off to generate a sequence of X-ray radiation pulses having varying pulse duration or varying durations between the X-ray radiaton pulses;
acquiring image data that includes at least one coded motion blur derived from a coded exposure sequence from a digital X-ray detector, wherein the image data is acquired from one or more imaging frames and wherein at least one imaging frame contains at least two X-ray radiation pulses; and
digitally restoring the image data by compensating for the at least one coded motion blur.

21. The image processing method of claim 20, comprising generating at least one deblurred image from the digitally restored image data.

22. The image processing method of claim 20, comprising estimating a speed of an imaged object or imaging system components to determine a width of the at least one coded blur.

* * * * *